US011310570B2

(12) United States Patent
Gui et al.

(10) Patent No.: US 11,310,570 B2
(45) Date of Patent: Apr. 19, 2022

(54) MULTI-LAYER WAVELENGTH-DIVISION MULTIPLEXING DEVICES

(71) Applicant: ALLIANCE FIBER OPTIC PRODUCTS, INC., Sunnyvale, CA (US)

(72) Inventors: Dong Gui, San Jose, CA (US); Yao Li, Newark, CA (US); Shudong Xiao, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 17/064,103

(22) Filed: Oct. 6, 2020

(65) Prior Publication Data

US 2021/0037298 A1   Feb. 4, 2021

Related U.S. Application Data

(63) Continuation of application No. PCT/US2019/025776, filed on Apr. 4, 2019.

(60) Provisional application No. 62/658,777, filed on Apr. 17, 2018.

(51) Int. Cl.
*H04J 14/02* (2006.01)
*G02B 6/293* (2006.01)
*H04Q 11/00* (2006.01)

(52) U.S. Cl.
CPC ...... *H04Q 11/0005* (2013.01); *H04J 14/0256* (2013.01); *H04J 14/0263* (2013.01); *H04Q 2011/0015* (2013.01); *H04Q 2011/0016* (2013.01); *H04Q 2011/0058* (2013.01)

(58) Field of Classification Search
CPC ...................................................... H04J 14/02
See application file for complete search history.

(56) References Cited

U.S. PATENT DOCUMENTS

| | | | |
|---|---|---|---|
| 4,622,663 A * | 11/1986 | Ishikawa | G02B 6/2713 |
| | | | 385/37 |
| 5,737,104 A | 4/1998 | Lee et al. | |
| 5,786,915 A | 7/1998 | Scobey | |
| 5,889,899 A * | 3/1999 | Henry | G02B 6/12007 |
| | | | 385/10 |
| 6,008,920 A | 12/1999 | Hendrix | |
| 6,167,171 A | 12/2000 | Grasis et al. | |
| 7,092,587 B1 | 8/2006 | Denis | |
| 7,787,731 B2 | 8/2010 | Bookbinder et al. | |

(Continued)

FOREIGN PATENT DOCUMENTS

KR    10-2014-0126635 A    10/2014

OTHER PUBLICATIONS

W. Shi et al., "Ultra-compact, flat-top demultiplexer using anti-reflection contra-directional couplers for CWDM network on silicon", OSA, 2013 (Year: 2013).*

(Continued)

*Primary Examiner* — Shi K Li
(74) *Attorney, Agent, or Firm* — Adam R. Weeks

(57) ABSTRACT

Disclosed herein are multi-layer wavelength-division multiplexing (WDM) devices that include a first optical signal router to route first demultiplexed signals from a common layer to a first channel layer and a second optical signal router to route second demultiplexed signals from the common layer to a second channel layer.

20 Claims, 12 Drawing Sheets

(56) References Cited

U.S. PATENT DOCUMENTS

| | | | |
|---|---|---|---|
| 7,843,644 B1* | 11/2010 | Wang | G02B 6/262 |
| | | | 359/641 |
| 8,908,281 B2 | 12/2014 | Fu | |
| 9,401,773 B1 | 7/2016 | Gui et al. | |
| 9,551,833 B1 | 1/2017 | Li et al. | |
| 9,590,759 B1 | 3/2017 | Peng et al. | |
| 2008/0166094 A1 | 7/2008 | Bookbinder et al. | |
| 2009/0103866 A1* | 4/2009 | Morris | G02B 6/2938 |
| | | | 385/39 |
| 2009/0169163 A1 | 7/2009 | Abbott et al. | |
| 2010/0329678 A1 | 12/2010 | Wang et al. | |
| 2014/0355987 A1 | 12/2014 | Zhu et al. | |
| 2016/0187585 A1 | 6/2016 | Yue | |
| 2017/0261691 A1 | 9/2017 | Yue | |
| 2018/0059328 A1* | 3/2018 | Shi | G02B 6/29382 |
| 2019/0067359 A1* | 2/2019 | Matsumoto | H04N 5/374 |

OTHER PUBLICATIONS

International Search Report and Written Opinion of the International Searching Authority; PCT/US19/025776; dated Jun. 28, 2019; 11 Pages; European Patent Office.

International Search Report and Written Opinion of the International Searching Authority; PCT/US19/042740; dated Nov. 8, 2019; 13 Pages; European Patent Office.

International Search Report and Written Opinion of the International Searching Authority; PCT/US2019/022235; dated Jun. 7, 2019; 15 Pages; European Patent Office.

Wang et al., "Compact CWDM: a low-cost high-performance packaging platform", Proceedings of Spie Medical Imaging, vol. 5729, Mar. 25, 2005, p. 285.

* cited by examiner

MULTI-LAYER WAVELENGTH-DIVISION MULTIPLEXING DEVICES

PRIORITY APPLICATION

This application is a continuation of International Application No. PCT/US19/25776, filed on Apr. 4, 2019, which claims the benefit of priority to U.S. Application No. 62/658,777, filed on Apr. 17, 2018, both applications being incorporated herein by reference.

BACKGROUND

The disclosure relates to wavelength-division multiplexing and demultiplexing, and more particularly, to wavelength-division multiplexing devices with multiple layers.

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM devices and associated devices can be used as components in an optical network, such as a passive optical network (PON).

In this regard, FIG. 1 is a diagram illustrating a WDM device 100. The WDM device 100 includes a common port 102, a plurality of channel ports 104(1)-104(7) (may be referred to generally as a channel port 104), and a plurality of WDM filters 106(1)-106(7) (may be referred to generally as a WDM filter 106). The common port 102 is configured for optical communication of a multiplexed signal including a plurality of demultiplexed signals. Each of the channel ports 104 is configured for optical communication of one of the plurality of demultiplexed signals. The WDM filters 106 are configured for routing demultiplexed signals of a multiplexed signal between the common port 102 and the channel ports 104 along an optical signal path 108. The channel ports 104 are divided into a first channel array 110(1) and a second channel array 110(2). The WDM filters 106 are divided into a first WDM array 112(1) aligned along a first axis A1, and a second WDM array 112(2) aligned along a second axis B1.

Each WDM filter 106 requires the optical signal path 108 intersect the WDM filter 106 within a maximum angle of incidence (AOI) to filter and route the demultiplexed signals. The AOI is the angle that the signal makes with a perpendicular to a surface of the filter at the point of incidence. For example, in FIG. 1 the common port 102 transmits a multiplexed signal to the first WDM filter 106(1) along a first portion 114(1) of the optical signal path 108 which intersects the first WDM filter 106(1) at a first AOI $\alpha1(1)$. A portion of the multiplexed signal is reflected by the first WDM filter 106(1) and transmits along a second portion 114(2) of the optical signal path 108 which intersects the second WDM filter 106(2) at a second AOI $\alpha1(2)$.

Different WDM filters have different maximum AOIs. For example, multiband filters (e.g., for XGS signals, NG-PON2 signals, etc.) may have a smaller maximum AOIs than single passband filters. WDM filters 106 with smaller maximum AOIs may have high isolation, wider pass band, etc. WDM filters 106 that have smaller maximum AOIs may also require larger distances X1 between the first WDM set 112(1) (and common port 102) and the second WDM set 112(2), because the WDM filters 106 must maintain a minimum relative distance Y1 from each other in order for the signals to say within the maximum AOI, and because the WDM filters (e.g., the WDM filters 106 in the first WDM set 112(1)) cannot be moved closer to each other than their widths allow. Accordingly, the distance X1 between the first WDM set 112(1) (and common port 102) and the second WDM set 112(2) is determined by the smallest maximum AOI for a single WDM filter 106, even if all of the other WDM filters 106 allow for much larger AOIs. This can result in a WDM device 100 with a large overall size and footprint. Further, the larger the distance X1 between the first WDM set 112(1) (and common port 102) and the second WDM set 112(2), the longer distance the portions of the optical signal path 108 must travel between filters (e.g., D1, D2). A longer optical signal path 108 may result in larger signal loss and decreased performance.

FIG. 2 is a diagram illustrating optical signal paths of a WDM device 200. The WDM device 200 includes a first common port 202A in communication with a first set of channel ports 204A(1)-204A(7) (may be referred to generally as first set of channel ports 204A), and a second common port 202B in communication with a second set of channel ports 204B(1)-204B(7) (may be referred to generally as second set of channel ports 204B), and a plurality of WDM filters 206(1)-206(7). The WDM filters 206(1)-206(7) route signals between the first common port 202A and the first set of channel ports 204A(1)-204A(7) along a first optical signal path 208(1), and route signals between the second common port 202B and the second set of channel ports 204B(1)-204B(7) along a second optical signal path 208(2). The first set of channel ports 204A(1)-204A(7) is divided into a first channel array 210A(1) and a second channel array 210A(2). The second set of channel ports 204B(1)-204B(7) is divided into a first channel array 210B(1) and a second channel array 210B(2). The first channel array 210A(1) of the first group of channel ports 204A is horizontally aligned with the first channel array 210B(1) of the second group of channel ports 204B. The second channel array 210B(1) of the first group of channel ports 204A is horizontally aligned with the second channel array 210B(2) of the second group of channel ports 204B. The WDM filters 206 are divided into a first WDM array 212(1) aligned along a first axis A2, and a second WDM array 212(2) aligned along a second axis B2 and separated by a distance X2(1). The WDM device 200 requires a minimum distance X2(2) between the first channel arrays 210A(1), 210B(1) and the first WDM array 212(1), and a minimum distance X2(3) between the second channel arrays 210(2), 210B(2) and the second WDM array 212(2). These minimum distances X2(2), X2(3) ensure sufficient distance for the interleaved signals of the first group of channel ports 204A(1)-204A(7) to separate from those of the second group of channel ports 204A(1)-204A(7) and to accommodate the maximum AOIs of the WDM filters 206.

As noted above, smaller maximum AOIs require a greater distance X2(1) between the first WDM array 212(1) and the second WDM array 212(2). However, smaller maximum AOIs also require greater distances X2(2), X2(3). This can result in a WDM device 200 with a large overall size and footprint.

No admission is made that any reference cited herein constitutes prior art. Applicant expressly reserves the right to challenge the accuracy and pertinency of any cited documents.

SUMMARY

Disclosed herein are wavelength-division multiplexing (WDM) devices. In particular, disclosed is a multi-layer WDM device that includes a common layer, a first channel layer, a second channel layer, a first optical signal router to route first demultiplexed signals (also called first signals) from the common layer to the first channel layer, and a second optical signal router to route second demultiplexed signals (also called second signals) from the common layer to the second channel layer. Such a design may decrease the footprint size, especially when using small angle of incidences (AOIs) that typically require large distances between WDM filters and ports. Accordingly, the WDM devices may provide a number of improvements and advantages, including a smaller overall size and footprint.

One embodiment of the disclosure relates to a wavelength-division multiplexing (WDM) device that includes a common layer, a first channel layer, a second channel layer, a first optical signal router, and a second optical signal router. The common layer comprises a first common port and a first WDM filter. The first common port is configured for optical communication of a first multiplexed signal (also called a multiplexed signal) comprising a first demultiplexed signal (also called a first signal) and a second demultiplexed signal. The first WDM filter has a first passband configured to pass the first demultiplexed signal of the first multiplexed signal and reflect the second demultiplexed signal of the first multiplexed signal. The first channel layer comprises a first channel port. The first channel port is configured for optical communication of the first demultiplexed signal. The second channel layer comprises a second channel port. The second channel port is configured for optical communication of the second demultiplexed signal. The first optical signal router is configured to route the first demultiplexed signal from the common layer to the first channel layer. The second optical signal router is configured to route the second demultiplexed signal from the common layer to the second channel layer.

An additional embodiment discloses a wavelength-division multiplexing (WDM) device that comprises a common layer, a first channel layer, a second channel layer, a first optical signal router, and a second optical signal router. The common layer comprises a first common port configured for optical communication of a first multiplexed signal comprising a first demultiplexed signal and a second demultiplexed signal, and a first WDM filter has a first passband configured to pass the first demultiplexed signal of the first multiplexed signal and reflect the second demultiplexed signal of the first multiplexed signal. The first channel layer is offset from the common layer. The first channel layer comprises a first channel port configured for optical communication of the first demultiplexed signal. The second channel layer is offset from the common layer. The second channel layer comprises a second channel port configured for optical communication of the second demultiplexed signal. The first optical signal router is positioned to overlap the common layer and the first channel layer. The first optical signal router is configured to route the first demultiplexed signal from the common layer to the first channel layer. The second optical signal router is positioned to overlap the common layer and the second channel layer. The second optical signal router is configured to route the second demultiplexed signal from the common layer to the second channel layer.

An additional embodiment discloses a method of using a wavelength-division multiplexing (WDM) device. The method includes transmitting from a first common port of a common layer a first multiplexed signal comprising a first demultiplexed signal and a second demultiplexed signal. The method further includes routing by a WDM filter of the common layer the first demultiplexed signal to a first channel port of a first channel layer via a first optical signal router overlapping the common layer and the first channel layer, the first channel layer offset from the common layer. The method further includes routing by the WDM filter of the common layer the second demultiplexed signal to a second channel port of a second channel layer via a second optical signal router overlapping the common layer and the second channel layer, the second channel layer offset from the common layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
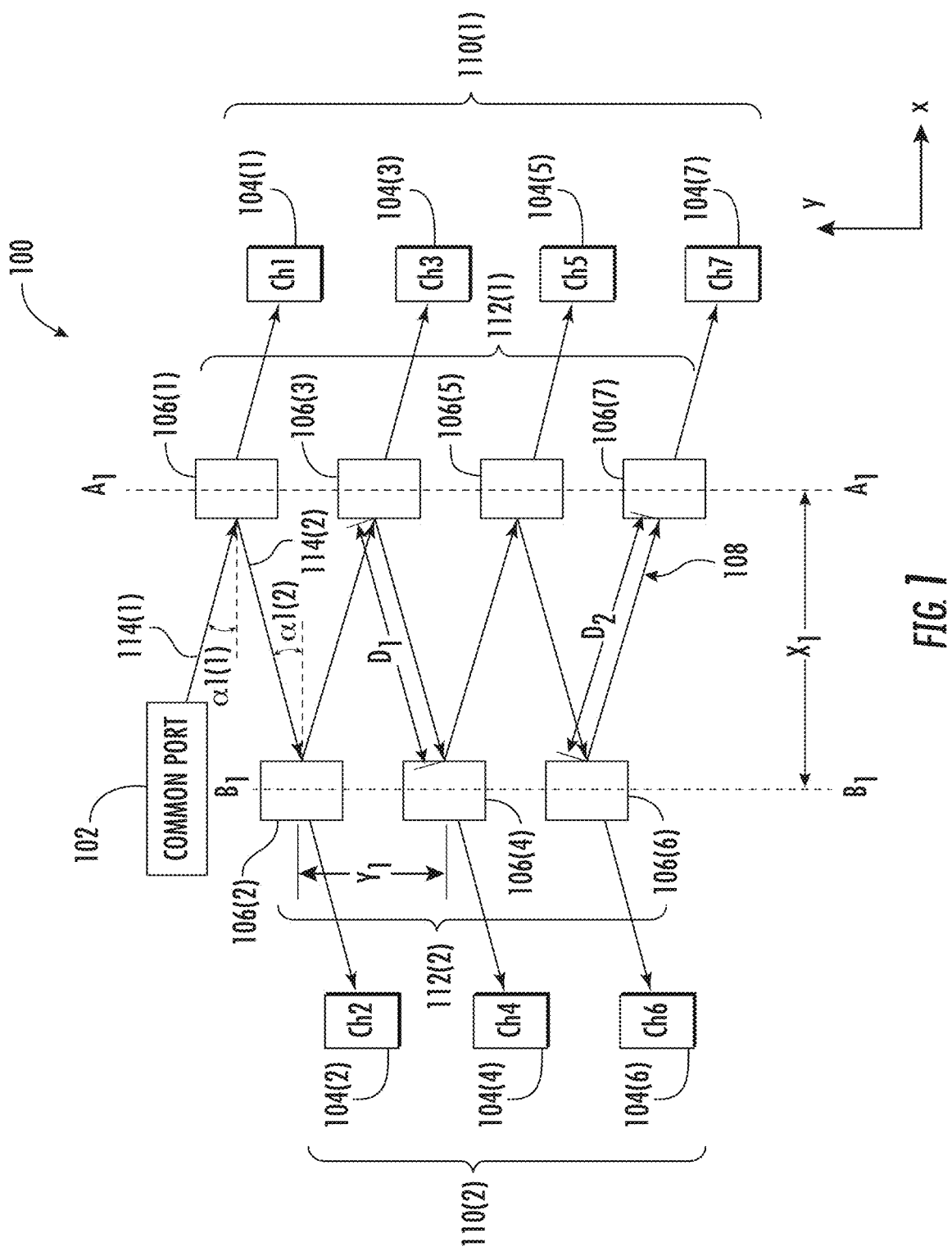
FIG. 1 is a diagram illustrating a wavelength-division multiplexing (WDM) device.
Figure 2:
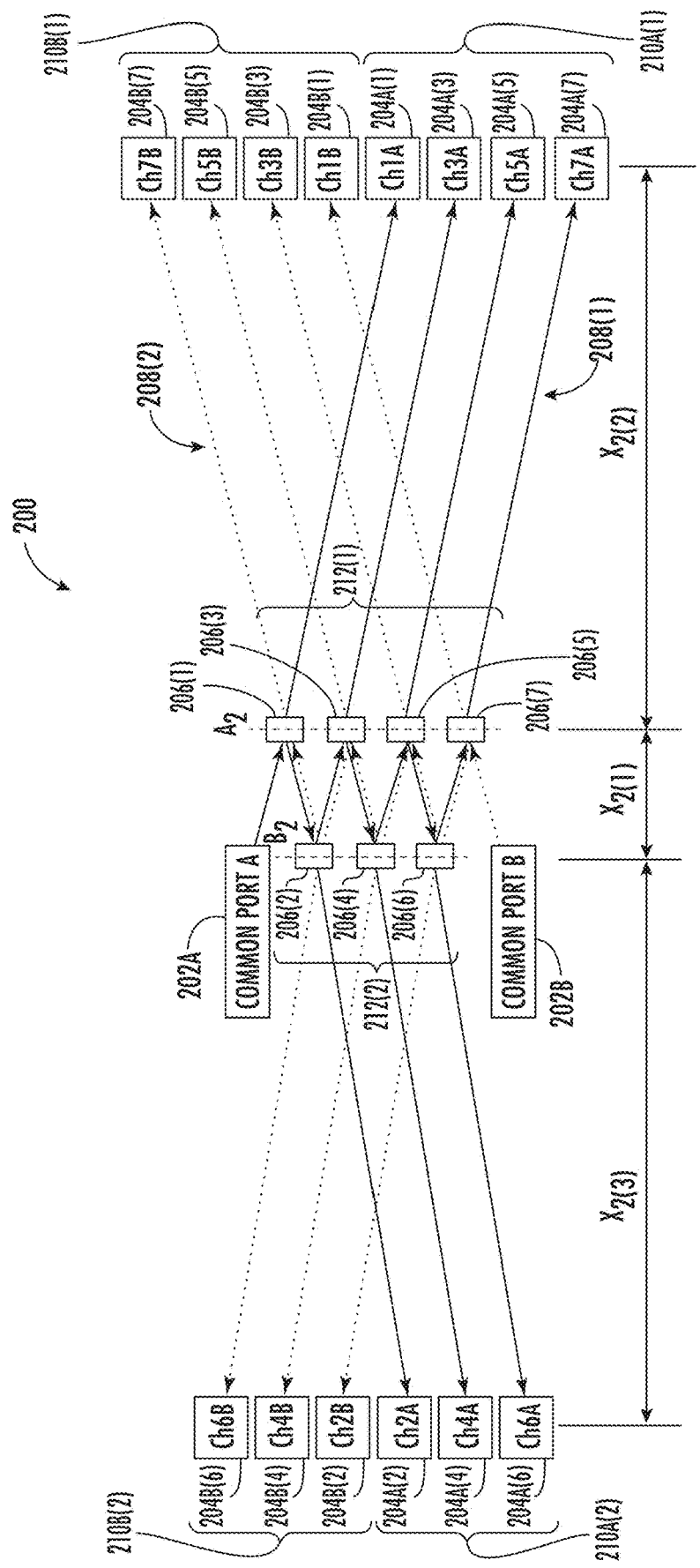
FIG. 2 is a diagram illustrating optical signal paths of a WDM device.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," "coplanar," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working examples.

As used herein, the terms "optical communication," "in optical communication," and the like mean that two elements are arranged such that optical signals are passively or actively transmittable therebetween via a medium, such as, but not limited to, an optical fiber, free space, index-matching structure or gel, reflective surface, connectors, or other light directing or transmitting means.

As used herein, the term "port" means an interface for actively or passively passing (e.g., receiving, transmitting, or both receiving and transmitting) optical signals. A port may include, by way of non-limiting examples, one or more collimators, pigtails, fiber optic connectors, optical splices, optical fibers, free-space, or a combination of the foregoing.

As used herein, the term "pigtail" means a one or more optical fibers that extend from a ferrule. The one or more optical fibers may each be terminated with a fiber optical connector but are not required to be terminated a fiber optic connector.

Disclosed herein are wavelength-division multiplexing (WDM) devices. In particular, disclosed are multi-layer WDM devices that include a common layer, a first channel layer, a second channel layer, a first optical signal router to route first demultiplexed signals from the common layer to the first channel layer, and a second optical signal router to route second demultiplexed signals from the common layer to the second channel layer. Such a design may decrease the footprint size, especially when using WDM filters having small angle of incidences (AOIs) that require larger distances between WDM filters and ports. Accordingly, the WDM devices may provide a number of improvements and advantages, including a smaller overall size and footprint.

It is noted that the features discussed herein can be used in a variety of applications, including NG-PON2 applications.

Figure 3A:
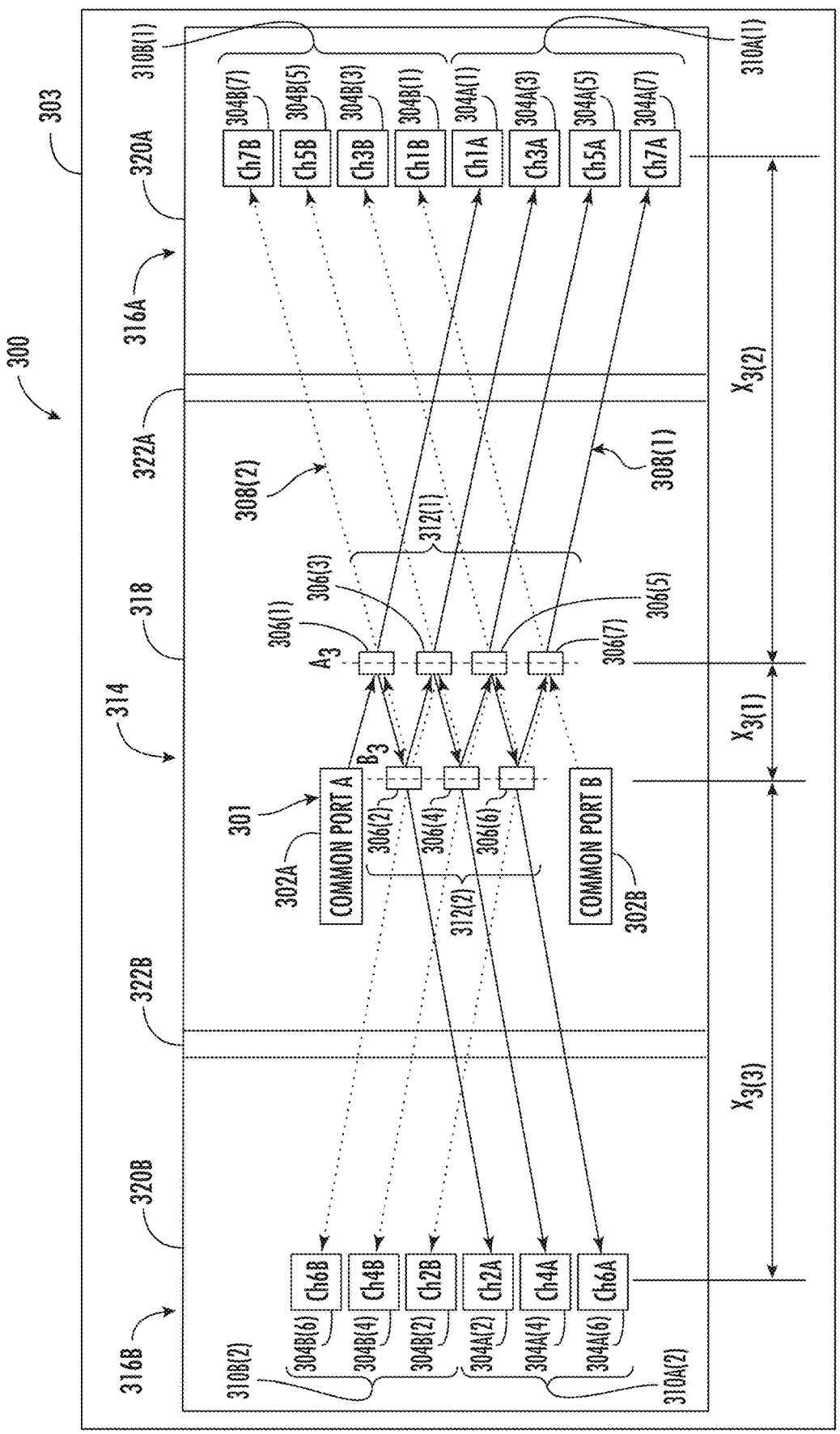
FIG. 3A is a diagram illustrating optical signal paths of a multi-layer WDM device using three layers.
Figure 3B:
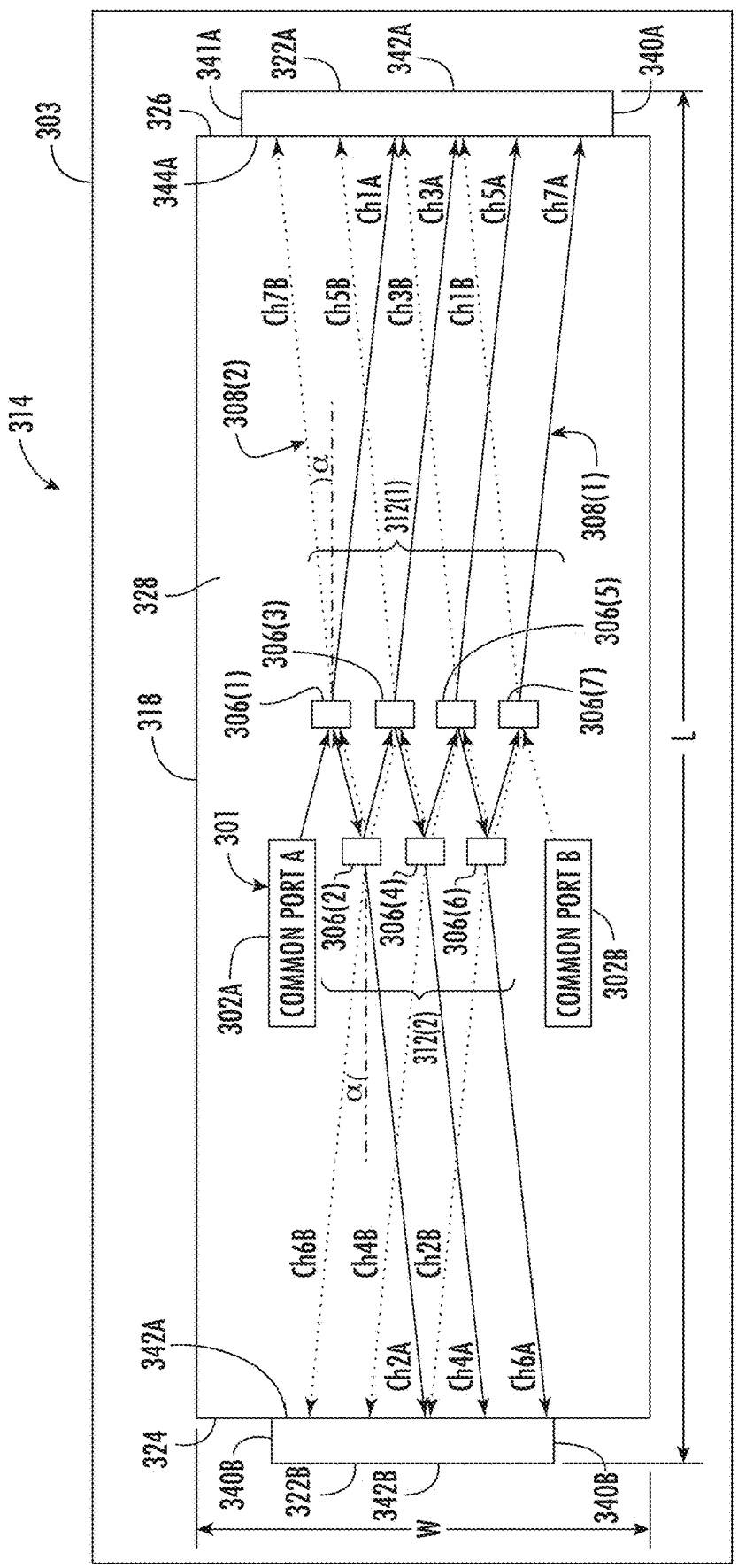
FIG. 3B is a top view of a common layer of the WDM device of FIG. 3A.
Figure 3C:
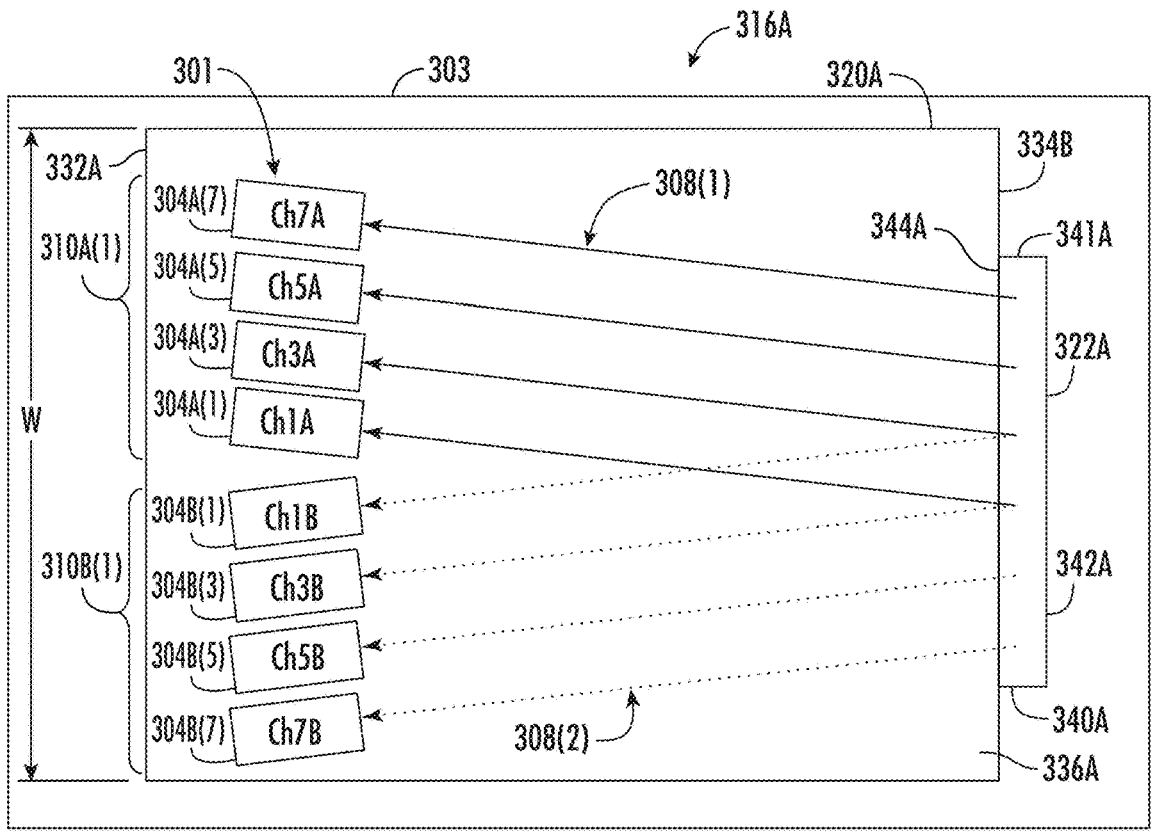
FIG. 3C is a top view of a first channel layer of the WDM device of FIG. 3A.
Figure 3D:
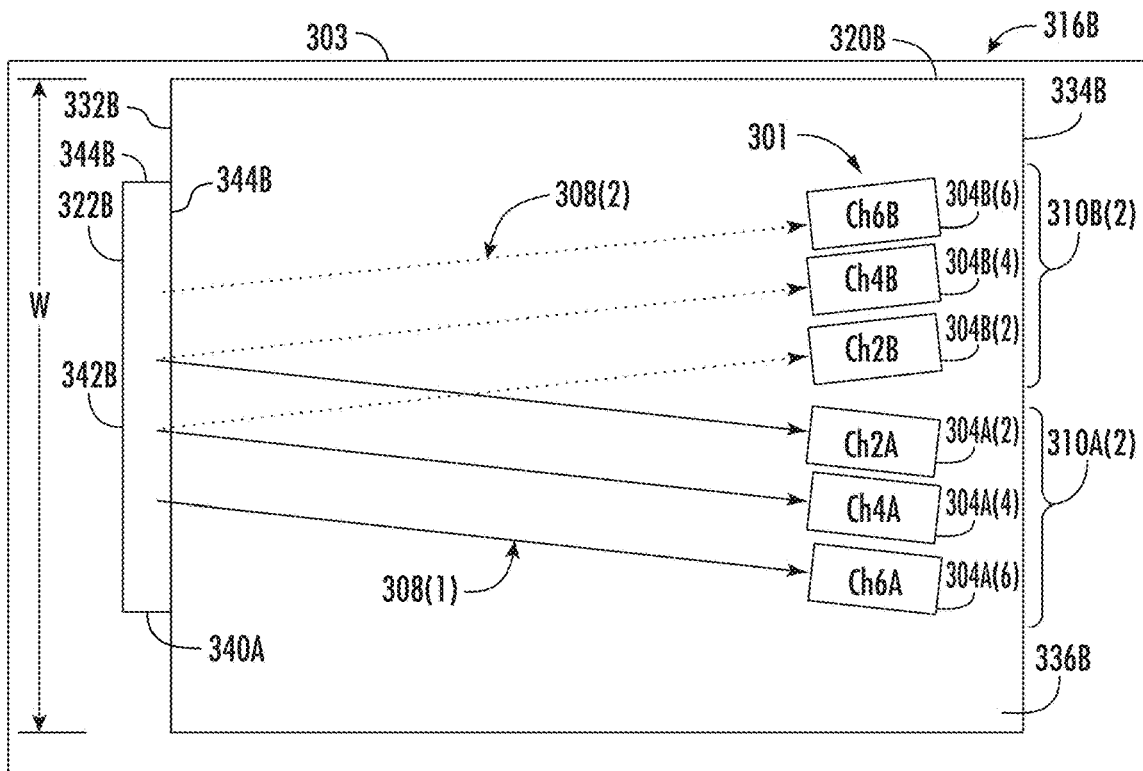
FIG. 3D is a top view of a second channel layer of the WDM device of FIG. 3A.
Figure 3E:
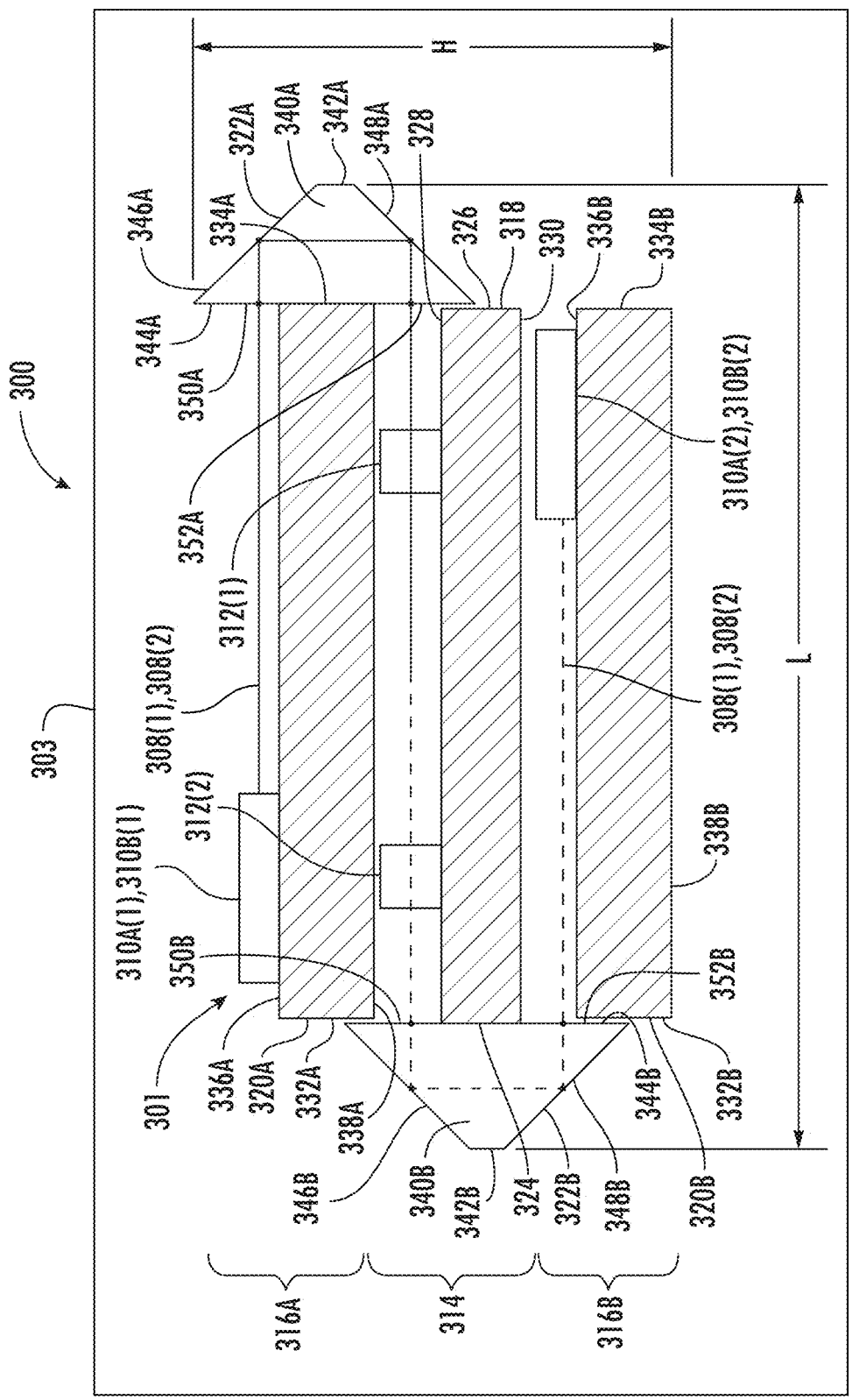
FIG. 3E is a side elevation view of the WDM device of FIG. 3A.

FIGS. 3A-3E are diagrams and views illustrating optical signal paths of a multi-layer WDM device 300 with a reduced footprint. FIG. 3A is a diagram illustration of optical signal paths of the multi-layer WDM device 300 showing three layers 314, 316A, 316B in a single view for ease of reference and discussion; FIGS. 3B, 3C and 3D illustrate top views of each of the three layers 314, 316A, 316B separately; and FIG. 3E illustrates a side elevation view of the WDM device 300, so that all three layers 314, 316A, 316B are visible.

Referring initially to FIG. 3A, the WDM device 300 includes a WDM subassembly 301, one or more signal routers 322A, 322B, and one or more substrates 318, 320A, 320B within a housing 303. The WDM subassembly 301 includes a first group of channel ports 304A(1)-304A(7), a second group of channel ports 304B(1)-304B(7), a first common port 302A in optical communication with the first group of channel ports 304A(1)-304A(7) (may be referred to generally as first group of channel ports 304A), a second common port 302B in optical communication with the second group of channel ports 304B(1)-304B(7) (may be referred to generally as second group of channel ports 304B), and a plurality of WDM filters 306(1)-306(7). The first common port 302A is configured for optical communication of a first multiplexed signal (also called a multiplexed signal) comprising a first demultiplexed signal (also called a first signal) and a second demultiplexed signal (also called a second signal). The second common port 302B is configured for optical communication of a second multiplexed signal comprising a third demultiplexed signal and a fourth demultiplexed signal.

The WDM filters 306(1)-306(7) route signals between the first common port 302A and the first group of channel ports 304A(1)-304A(7) along a first optical signal path 308(1), and route signals between the second common port 302B and the second group of channel ports 304B(1)-304B(7) along a second optical signal path 308(2). The first group of channel ports 304A(1)-304A(7) is divided into a first channel array 310A(1) and a second channel array 310A(2). The second group of channel ports 304B(1)-304B(7) is divided into a first channel array 310B(1) and a second channel array 310B(2). The first channel array 310A(1) of the first group of channel ports 304A is aligned with the first channel array 310B(1) of the second group of channel ports 304B. The second channel array 310B(1) of the first group of channel ports 304A is aligned with the second channel array 310B(2) of the group of channel ports 304B. The channel ports 304 and the common ports 302 may be embodied as collimators in some embodiments.

The WDM filters 306 are divided into a first WDM array 312(1) aligned along a first axis A3, and a second WDM array 312(2) aligned along a second axis B3 and separated by a distance X3(1).

The multi-layer WDM device 300 requires a minimum distance X3(2) between the first channel arrays 310A(1), 310B(1) and the first WDM array 312(1), and a minimum distance X3(3) between the second channel arrays 310A(2), 310B(2) and the second WDM array 312(2). These minimum distances X3(2), X3(3) ensure sufficient distance for the interleaved signals of the first group of channel ports 304A(1)-304A(7) to separate from those of the second group of channel ports 304A(1)-304A(7).

As noted above, WDM filters that have a small maximum AOIs require a greater distance X3(1) between the first WDM array 312(1) and the second WDM array 312(2) and greater distances X3(2), X3(3) between the first channel arrays 310A(1), 310B(1) and the first WDM array 312(1), and between the second channel arrays 310A(2), 310B(2) and the second WDM array 312(2), respectively.

To reduce the size of the WDM device, the WDM device 300 illustrated in FIGS. 3A-3E includes three layers: a common layer 314, a first channel layer 316A, and a second channel layer 316B. The common layer 314 is positioned between the first channel layer 316A and the second channel layer 316B. Referring specifically to FIG. 3B, the common layer 314 includes the common layer substrate 318, the first common port 302A, the second common port 302B, and the WDM filters 306(1)-306(7). The first common port 302A, the second common port 302B, and the WDM filters 306(1)-306(7) are mounted or coupled to the common layer substrate 318. Referring specifically to FIG. 3C, the first channel layer 316A includes a first channel layer substrate 320A, the first channel array 310A(1) and the first channel array 310B(1). The first channel array 310A(1) and the first channel array 310B(1) are mounted or coupled to the first channel layer substrate 320A. Referring specifically to FIG. 3D, the second channel layer 316B includes a second channel layer substrate 320B, the second channel array 310A(2) and the second channel array 310B(2). The second channel array 310A(2) and the second channel array 310B(2) are mounted or coupled to the second channel layer substrate 320B. Referring to FIGS. 3B-3E, the optical signal paths 308 are routed between the layers 314, 316A, 316B by a first optical signal router 322A and a second optical signal router 322B. The common layer substrate 318 is positioned between the first channel layer substrate 320A and the second channel layer substrate 320B.

Referring now to FIG. 3E, the common layer 314, the first channel layer 316A, and the second channel layer 316B are each offset vertically from each other (note that the first common port 302A, the second common port 302B, and the WDM filters 306(1)-306(7) are not shown in FIG. 3E for purposes of clarity). In embodiments that include three substrates, the common layer substrate 318, the first channel layer substrate 320A and the second channel layer substrate 320B are offset vertically from each other. In some embodiments, the vertical offset between the common layer substrate 318 and the first channel layer substrate 320A is equal to or slightly greater than a height of the first common port 302A or the WDM filters 306(1)-306(7) of the first WDM array 312(1) and the second WDM array 312(2). In some embodiments, the vertical offset between the common layer substrate 318 and the second channel layer substrate 320B is equal to or slightly greater than a height of the channel ports 304A(2), 304A(4), 304A(6) of the second channel array 310A(2) and/or the channel ports 304B(2), 304B(4), 304B(6) of the second channel array 310B(2). The offset between each substrate 318, 320A, and 320B provides room for the optical signal paths 308(1) and 308(2) to be routed between the substrates 318, 320A, and 320B by a first optical signal router 322A and a second optical signal router 322B, while also decreasing the size of the footprint of the WDM device 300. While the offset is vertical in FIG. 3E, it is understood that the offset may be oriented in other ways depending on the location and orientation of the WDM device 300. In one embodiment, the filters 306 are evenly separated (i.e., same distance between adjacent filters) by about 3 mm and have an AOI between about 4° and about 8°. In such embodiments, the multi-layer subassembly, which includes the common layer substrate 314, the first channel layer substrate 316A, the second channel layer substrate 316B, the first optical signal router 322A and the second optical signal router 322B, has a length L (see FIGS. 3B and 3E) between about 35 mm and about 70 mm, a width W (see FIGS. 3C and 3D) that is less than about 25 mm, and the height H (see FIG. 3E) that is less than or about equal to 10 mm.

Referring again to FIG. 3E, the common layer substrate 318 of the common layer 314 includes a left side 324, a right side 326 (opposite the left side 324), a top surface 328, and a bottom surface 330 (opposite the top surface 328). In FIG. 3E, the first WDM array 312(1) is positioned toward the right side 326 and the second WDM array 312(2) is positioned toward the left side 324. Accordingly, signal paths directed to the first channel array 310A(1) of the first group of channel ports 304A and the first channel array 310B(1) of the second group of channel ports 304B extend toward the right side 326 to contact the first optical signal router 322A. Signal paths directed to the second channel array 310A(2) of the first group of channel ports 304A and the second channel array 310B(2) of the second group of channel ports 304B extend toward the left side 324 to contact the second optical signal router 322B.

The first channel layer substrate 320A of the first channel layer 316A includes a left side 332A, a right side 334A (opposite the left side 332A), a top surface 336A, and a bottom surface 338A (opposite the top surface 336A). The first channel array 310A(1) and the first channel array 310B(1) are mounted toward a left side 332A of the first channel layer substrate 320A. The second channel layer substrate 320B of the second channel layer 316B includes a left side 332B, a right side 334B (opposite the left side 332B), a top surface 336B, and a bottom surface 338B (opposite the top surface 336B). The second channel array 310A(2) and the second channel array 310B(2) are mounted toward a right side 332B of the second channel layer substrate 320B.

Referring to FIGS. 3B-3E, in this exemplary embodiment, the first optical signal router 322A is embodied as a trapezoidal-shaped prism (may also be referred to as a trapezoidal prism), and is positioned at the right side 334A of the first channel layer substrate 320A for routing optical signals between the common layer 314 and the first channel layer 316A. In particular, the first optical signal router 322A includes a first base 340A (see FIGS. 3C and 3E), and a second base 341A (see FIG. 3C) opposite the first base 340A. The first and second bases 340A, 341A are trapezoidal-shaped. The first optical signal router 322A further includes a plurality of faces 342A, 344A, 346A, and 348A (also referred to as surfaces) extending between the first base 340A and the second base 341A. At least a portion of the plurality of faces 342A, 344A, 346A, and 348A provide surfaces for entry and/or exit of an optical signal therein, and/or reflective surfaces for routing (e.g., redirecting, rerouting) an optical signal therein.

More particularly, the first optical signal router 322A (also referred to as a trapezoidal-shaped prism) includes a narrow face 342A (also referred to as a front face), a broad face 344A (also referred to as a back face) opposite the narrow face 342A, an upper oblique face 346A positioned between upper edges of the narrow face 342A and the broad face 344A, and a lower oblique face 348A positioned between lower edges of the narrow face 342A and the broad face 344A. The narrow face 342A acts as a chamfer and minimizes stress points, reducing damage (e.g., chipping) to the first optical signal router 322A. In this way, in an exemplary embodiment, a chamfer (not shown) may also be provided between the broad face 344A and the upper oblique face 346A and/or between the broad face 344A and the lower oblique face 348A. Further, the distance between the narrow face 342A and the broad face 344A (e.g., the height of the trapezoid) may be reduced as long as the optical signal path intersects the upper oblique face 346A and/or the lower oblique face 348A at the appropriate locations, such as to avoid the narrow face 342A.

In this exemplary embodiment, the broad face 344A of the first optical signal router 322A is secured to and approximately perpendicular to the first channel layer substrate 320A with at least an upper portion 350A of the broad face 344A extending above the top surface 336A of the first channel layer substrate 320A and at least a lower portion 352A of the broad face 344A extending below the bottom surface 338A of the first channel layer substrate 320A. The upper portion 350A and lower portion 352A provide exit and entry points for an optical signal (see, e.g., optical signal paths 308(1), 308(2)). The upper oblique face 346A redirects signals between an upper portion 350A of the broad face 344A and the lower oblique face 348A, and similarly, the lower oblique face 348A redirects signals between the lower portion 352A of the broad face 344A and the upper oblique face 346A.

In this exemplary embodiment, the second optical signal router 322B is embodied as a trapezoidal-shaped prism and is positioned at the left side 334B of the common layer substrate 318 for routing optical signals between the common layer 314 and the second channel layer 316B. In particular, the second optical signal router 322B includes a first base 340B (see FIGS. 3D and 3E), and a second base 341B (FIG. 3D) opposite the first base 340B. The first and second bases 340B, 341B are trapezoidal-shaped. The second optical signal router 322B further includes a plurality of faces 342B, 344B, 346A, and 348B (also referred to as subsurfaces) extending between the first base 340B and the second base 341B. At least a portion of the plurality of faces 342B, 344B, 346B, and 348B provide surfaces for entry and/or exit of an optical signal therein, and/or reflective surfaces for routing (e.g., redirecting, rerouting) an optical signal therein.

More particularly, the second optical signal router 322B (also referred to as a trapezoidal-shaped prism) includes a narrow face 342B (also referred to as a front face), a broad face 344B (also referred to as a back face) opposite the narrow face 342B, an upper oblique face 346B positioned between upper edges of the narrow face 342B and the broad face 344B, and a lower oblique face 348B positioned between lower edges of the narrow face 342B and the broad face 344B. The narrow face 342B acts as a chamfer and minimizes stress points, reducing damage (e.g., chipping) to the second optical signal router 322B. In this way, in an exemplary embodiment, a chamfer (not shown) may also be provided between the broad face 344B and the upper oblique face 346B and/or between the broad face 344B and the lower oblique face 348B. Further, the distance between the narrow face 342B and the broad face 344B (e.g., the height of the trapezoid) may be reduced as long as the optical signal path intersects the upper oblique face 346B and/or the lower oblique face 348B at the appropriate locations, such as to avoid the narrow face 342B.

In this exemplary embodiment, the broad face 344B is secured to and approximately perpendicular to the common layer substrate 318 with at least an upper portion 350B of the broad face 344B extending above the top surface 336B of the common layer substrate 318 and at least a lower portion 352B of the broad face 344B extending below the bottom surface 338B of the common layer substrate 318. The upper portion 350B and lower portion 352B provide exit and entry points for an optical signal. The upper oblique face 346B redirects signals between an upper portion 350B of the broad face 344B and the lower oblique face 348B, and similarly, the lower oblique face 348B redirects signals between the lower portion 352B of the broad face 344B and the upper oblique face 346B.

Referring to FIG. 3E, in certain embodiments, the first optical signal router 322A is positioned to overlap at least a portion of the common layer 314 and at least a portion of the first channel layer 316A, and the second signal router 322B is positioned to overlap at least a portion of the common layer 314 and the second channel layer 316B. As used herein, the term "overlap" means having a first object at least partially extending into a plane at least partially occupied by a second object. In particular, the first optical signal router 322A overlaps at least a portion of the common layer substrate 318 and the first channel layer substrate 320A, and the second signal router 322 overlaps at least a portion of the common layer substrate, the first channel layer substrate 320A, and the second channel layer substrate 320B. However, in other embodiments, the first optical signal router 322A and/or the second signal router 322B may overlap with more or fewer layers (e.g., common layer 314, first channel layer 316A, second channel layer 316B, etc.) and/or more or fewer substrates (e.g., common layer substrate 318, first channel layer substrate 320A, second channel layer substrate 320B, etc.).

It is noted that although three substrates 318, 320A, 320B are illustrated in FIGS. 3A-3E, fewer substrates could be used in other embodiments. For example, in certain embodiments, the first common port 302A, the second common port 302B, and/or the WDM filters 306 are mounted to the top surface 328 (e.g., first surface) of the common layer substrate 318, and the second channel array 310A(2) and the second channel array 310B(2) are mounted to the bottom surface 330 (e.g., second surface) of the common layer substrate 318. In this way, only two substrates may be needed.

In certain embodiments, the second channel layer substrate 320B is omitted, and the second channel array 310A (2) and the second channel array 310B(2) are mounted to the bottom surface 330 (e.g., second surface) of the common layer substrate 318.

In certain embodiments, the common layer substrate 318 is omitted and the first channel array 310A(1) and the first channel array 310B(1) are mounted to a top surface 336A (e.g., first surface) of the first channel layer substrate 320A (may also be referred to as a first substrate) of the first channel layer 316A, the first common port 302A, the second common port 302B, first WDM array 312(1), and the second WDM array 312(2) are mounted to a bottom surface 338A (e.g., second surface) of the first channel layer substrate 320A of the first channel layer 316A (the top surface 336A opposite the bottom surface 338A), and/or the second channel array 310A(2) and the second channel array 310B(2) are mounted to a bottom surface 338B of the second channel layer substrate 320B (may also be referred to as a second substrate).

It is noted that the first optical signal router 322A is mounted to the first channel layer substrate 320A, and the second signal router 322B is mounted to the common layer substrate 318. However, in other embodiments, the first optical signal router 322A and/or the second signal router 322B is mounted to the common layer substrate 318, the first channel layer substrate 320A, and/or the second channel layer substrate 320B. Further, in FIG. 3E the left sides 324, 332A, 332B, of the substrates 318, 320A, 320B are not all aligned with one another, and the right sides 326, 334A, 334B of the substrates 318, 320A, 320B are not all aligned with one another. For example, the right side 326 of the common layer substrate 318 is aligned with the right side 334B of the second channel layer substrate 332B, but offset from the right side 334A of the first channel layer substrate 320A. The left side 324 of the common layer substrate 318 is not aligned with either of the left side 332A of the first channel layer substrate 320A or the left side 332B of the second channel layer substrate 320B. However, in other embodiments, two or three of the left sides 324, 332A, 332B, of the substrates 318, 320A, 320B are aligned with one another, and/or two or three of the right sides 326, 334A, 334B of the substrates 318, 320A, 320B are aligned with one another. In particular, the first optical signal router 322A and/or second signal router 322B could hold the substrates 318, 320A, 320B in proper alignment, such as when the first optical signal router 322A and/or second signal router 322B are mounted to at least two of the three substrates 318, 320A, 320B.

Figure 3F:
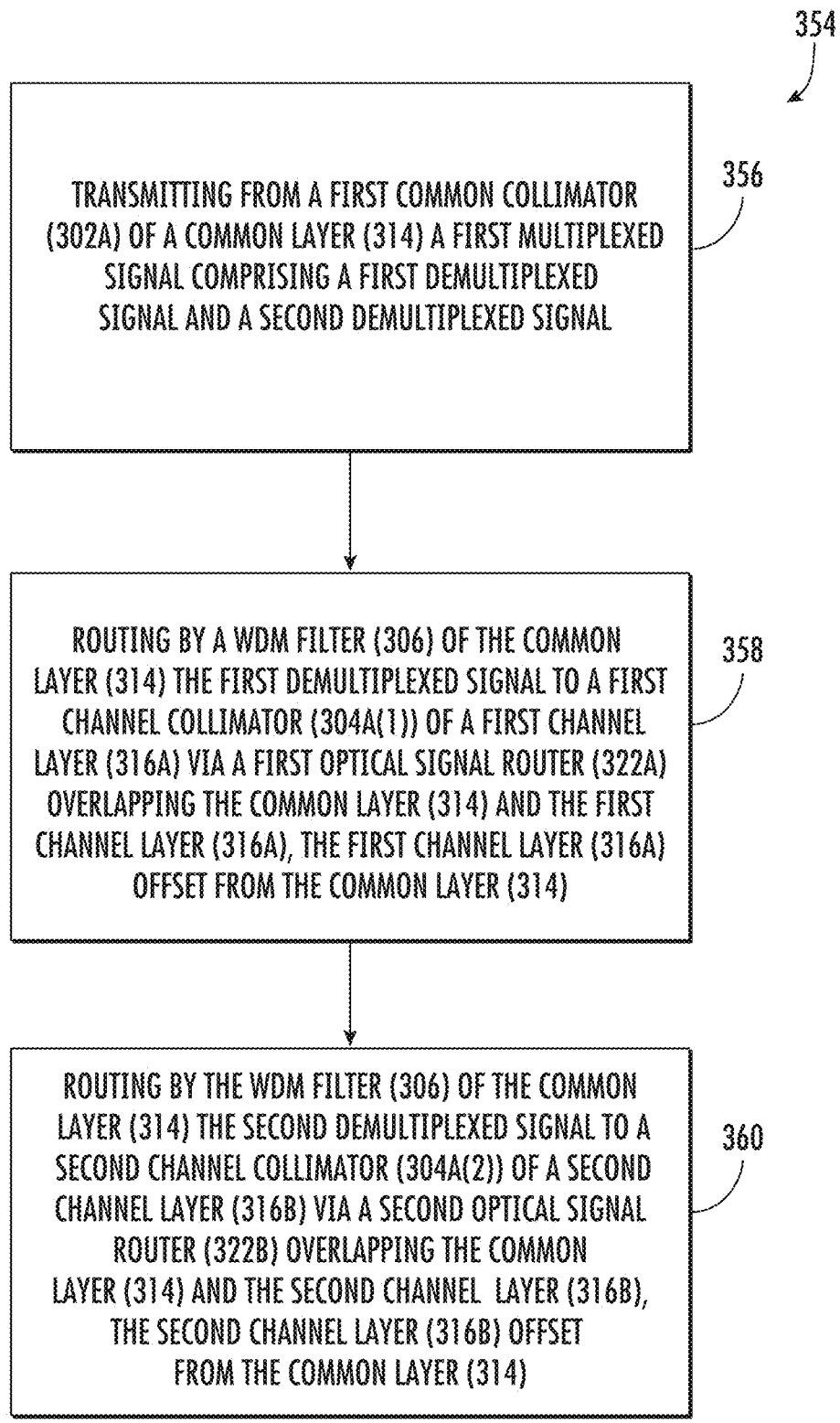
FIG. 3F is a flowchart of steps for using the WDM device of FIGS. 3A-3E.

FIG. 3F is a flowchart of steps 354 for using a WDM device 300. In step 356, a first common collimator (e.g., first common port 302A) of a common layer 314 is configured for optical communications of a first multiplexed signal and transmits the first multiplexed signal. The first multiplexed signal comprises a first demultiplexed signal and a second demultiplexed signal. In step 358, a WDM filter 306 (also called a first WDM filter) of the common layer 314 includes a first passband configured to pass the first demultiplexed signal of the first multiplexed signal and to reflect the second demultiplexed signal of the first multiplexed signal. As such, the WDM filter 306 routes the first demultiplexed signal to a first channel collimator (e.g., first channel port 304A(1)) of a first channel layer 316A via a first optical signal router 322A overlapping the common layer 314 and the first channel layer 316A, where the first channel layer 316A is offset from the common layer 314. In step 360, the WDM filter 306 of the common layer 314 also routes the second demultiplexed signal to a second channel collimator (e.g., second channel port 304A(2)) of a second channel layer 316B via a second optical signal router 322B overlapping the common layer 314 and the second channel layer 316B, where the second channel layer 316B is offset from the common layer 314. As noted above, the first channel layer 316A includes a first channel port (e.g., the channel port 304A(1)) configured for optical communication of the first demultiplexed signal and the second channel layer 316B includes a second channel port (e.g., the channel port 304A(2)) configured for optical communication of the second demultiplexed signal. The first optical signal router 322A is configured to route the first demultiplexed signal from the common layer 314 to the first channel layer 316A and the second optical signal router 322B is configured to route the second demultiplexed signal from the common layer 314 to the second channel layer 316B.

FIGS. 4-8 are views of example collimators and collimator arrays for use with the components and devices of FIGS. 3A-3F.

Figure 4:
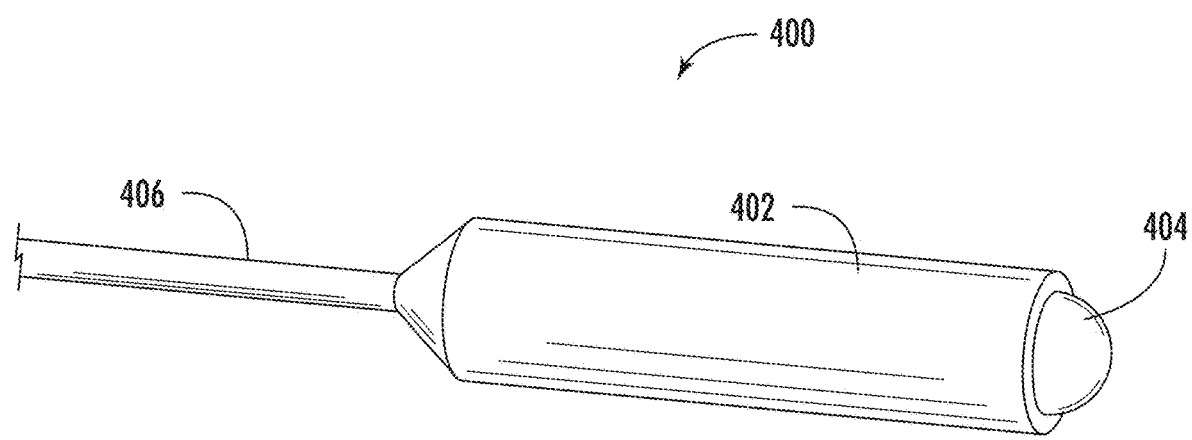
FIG. 4 is a perspective view of an example steel-tube collimator for use with the components and devices of FIGS. 3A-3F.

FIG. 4 is a perspective view of an example steel-tube collimator 400 for use with the components and devices of FIGS. 3A-3F. The collimator narrows a beam of particles or waves. In other words, the collimator causes the directions of motion to become more aligned in a specific direction. The steel-tube collimator 400 includes a steel-tube body 402, with a curved lens 404 at one end of the steel-tube body, and a fiber optic pigtail 406 at an opposite end of the steel-tube body.

Figure 5A:
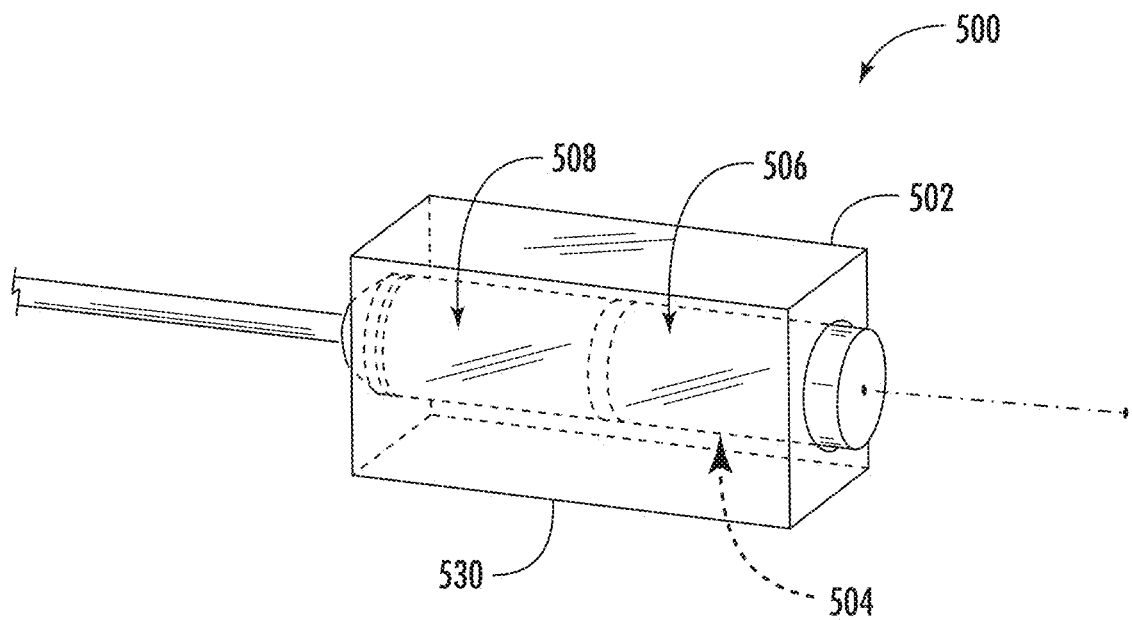
FIG. 5A is a perspective view of an example square tube collimator for use with the components and devices of FIGS. 3A-3F.
Figure 5B:
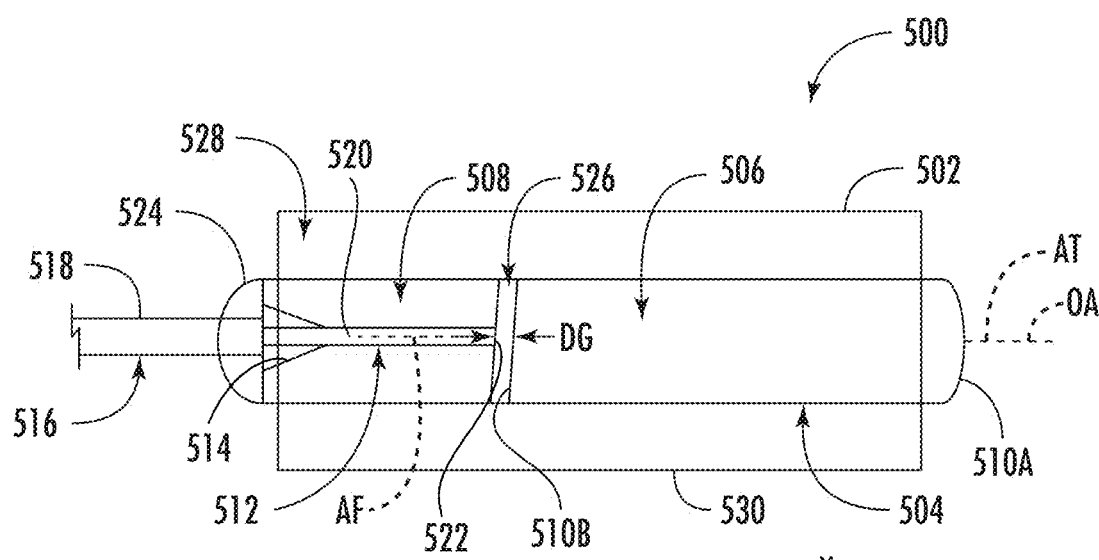
FIG. 5B is a cross-sectional top view of the square tube collimator of FIG. 5A.

FIGS. 5A and 5B are views of an example square tube collimator for use with the components and devices of FIGS. 3A-3F. The square tube collimator 500 includes a glass tube 502 (e.g., cylindrical) with a central bore 504. As used herein, the term "cylindrical" is used in its most general sense and can be defined as a three-dimensional object formed by taking a two-dimensional object and projecting it in a direction perpendicular to its surface. Thus, a cylinder, as the term is used herein, is not limited to having a circular cross-sectional shape but can have any cross-sectional shape, such as the square cross-sectional shape described below by way of example.

The square tube collimator 500 further includes optical elements, such as a collimating lens 506, ferrule 508, etc., which can be secured to the glass tube 502 using a securing mechanism (e.g., an adhesive). The collimating lens 506 has a front surface 510A and a back surface 510B opposite thereto. In the example shown, the front surface 510A is convex while the back surface 510B can be angled, e.g., in the x-z plane as shown. In an example, the front surface 510A of collimating lens 506 can reside outside of the central bore 504, i.e., the front-end portion of the collimating lens 506 can extend slightly past the front end of the glass tube 502. In an example, the collimating lens 506 can be formed as a gradient-index (GRIN) element that has a planar front surface 510A. In an example, the collimating lens 506 can consist of a single lens element, while in another example it can consist of multiple lens elements. In the discussion below, the collimating lens 506 is shown as a single lens element for ease of illustration and discussion.

The optical fiber support member is the form of a ferrule 508. The ferrule 508 includes a central bore 512 that runs between a front end and a back end along a ferrule central axis AF, which in an example is co-axial with the tube central axis AT of the glass tube 502 and the optical axis OA as defined by the collimating lens 506. The central bore 512 can include a flared portion 514 at the back end of the ferrule 508.

An optical fiber 516 has a coated portion 518, and an end portion 520 is bare glass (e.g., is stripped of the coated portion) and is thus referred to as the "bare glass portion." The bare glass portion 520 includes a polished end face 522 that defines a proximal end of the optical fiber. The bare glass portion 520 of the optical fiber 516 extends into the central bore 512 of the ferrule 508 at the back end of the ferrule 508. A securing element 524 can be disposed around the optical fiber 516 at the back end of the ferrule 508 to secure the optical fiber to the ferrule 508. The front end of the ferrule 508 is angled in the x-z plane and is axially spaced apart from the angled back end of the collimating lens to define a gap 526 that has a corresponding axial gap distance DG. While a glass optical fiber is described above, other types of optical fibers may be used, such as, for example, a plastic optical fiber.

The ferrule 508, optical fiber 516, and securing element 524 constitute a fiber optic pigtail 528, which can be said to reside at least partially within the bore 504 adjacent the back end of the glass tube 502. Thus, in an example, the square tube collimator 500 includes only the glass tube 502, the collimating lens 506, and the fiber optic pigtail 528. The glass tube 502 serves in one capacity as a small lens barrel that supports and protects the collimating lens 506 and the fiber optic pigtail 528, particularly the bare glass portion 520 and its polished end face 522. The glass tube 502 also serves in another capacity as a mounting member that allows for the square tube collimator 500 to be mounted to a support substrate. In this capacity, at least one flat surface 530 serves as a precision mounting surface.

In an example, the glass tube 502, the collimating lens 506, and the ferrule 508 are all made of a glass material, and further in an example, are all made of the same glass material. Making the glass tube 502, the collimating lens 506, and the ferrule 508 out of a glass material has the benefit that these components will have very close if not identical, coefficients of thermal expansion (CTE). This feature is particularly advantageous in environments that can experience large swings in temperature.

In an example, the optical elements used in micro-optical systems are sized to be slightly smaller than the diameter of the bore 504 (e.g., by a few microns or tens of microns) so that the optical elements can be inserted into the bore 504 and be movable within the bore 504 to a select location. In an example, the select location is an axial position where the optical element resides for the micro-optical system to have optimum or substantially optimum optical performance. Here, substantially optimum performance means performance that may not be optimum, but that is within a performance or specification for the micro-optical system.

In another example, the optical elements have a clearance with respect to the bore 504 in the range of a few microns (e.g., 2 microns or 3 microns) to tens of microns (e.g., 20 microns up to 50 microns). A relatively small value for the clearance allows for the optical elements to be well-aligned with the central bore axis AB, e.g., to within a few microns (e.g., from 2 microns to 5 microns).

The optical elements and the support/positioning elements can be inserted into and moved within the bore 504 to their select locations using micro-positioning devices. The optical elements and the support/positioning elements can be secured within the bore 504 using a number of securing techniques. One example of a securing technique uses a securing feature that is an adhesive (e.g., a curable epoxy). Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements can be secured within the bore 504 using one or more securing features, and can also be supported and/or positioned using one or more support/positioning elements. The non-adhesive securing techniques described below allow for the micro-optical systems disclosed herein to remain free of adhesives so that, for example, micro-optical systems can consist of glass only.

Figure 6A:
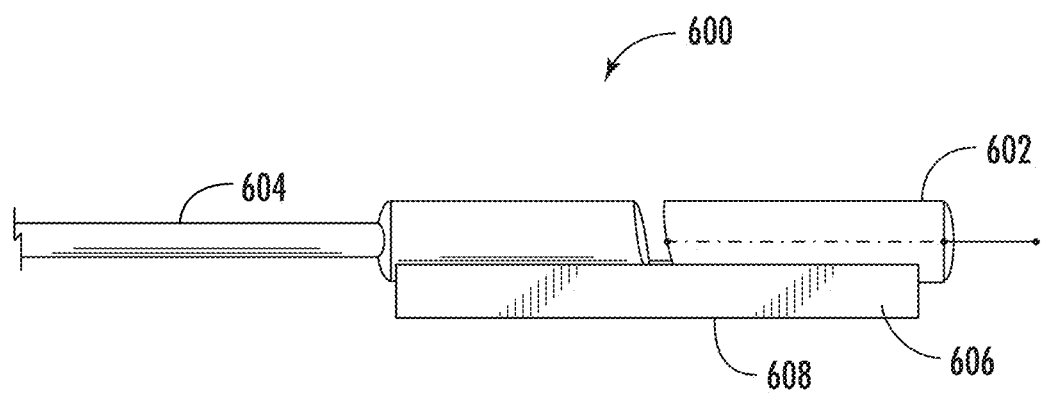
FIG. 6A is a side view of an example compact collimator for use with the components and devices of FIGS. 3A-3F.

FIG. 6A is a side view of an example compact collimator for use with the components and devices of FIGS. 3A-3F. A collimator 600 includes a lens 602 (e.g., a glass or silica collimating lens), a fiber optic pigtail 604, and a groove (e.g., a generally V-shaped groove) formed in a base 606. The lens 602 and the fiber optic pigtail 604 are disposed in the groove. The lens 602 is configured to receive a light signal provided to the WDM multiplexer/demultiplexer from an external optical transmission system or provide a light signal multiplexed or demultiplexed by the WDM to an external optical transmission system. The lens 602, for example, may be configured to receive a light signal from a fiber optic element for multiplexing or demultiplexing and/or to provide a multiplexed or demultiplexed light signal to an external fiber optic element. The fiber optic pigtail 604 is operatively coupled to the lens 602 and is configured to provide a light signal to the lens 602 from the external fiber optic element and/or to receive the light signal from the lens 602 for transmission to the external fiber optic element.

In various embodiments, the lens 602 and the fiber optic pigtail 604 may or may not contact each other. The lens 602 and the fiber optic pigtail 604 may be securable to the groove independent of each other to allow for precise adjustment of a pointing angle between an optical beam from the collimator 600 and a side and/or bottom surface of the groove. In addition, the lens 602 and fiber optic pigtail 604 may have the same outer diameter.

The base 606 of the collimator 600 has a generally flat bottom surface 608 for mounting on a substrate of a WDM multiplexer/demultiplexer or other optical system. The base 606 further includes a width that is less than a width of the lens 602 and a width of the fiber optic pigtail 604.

Figure 6B:
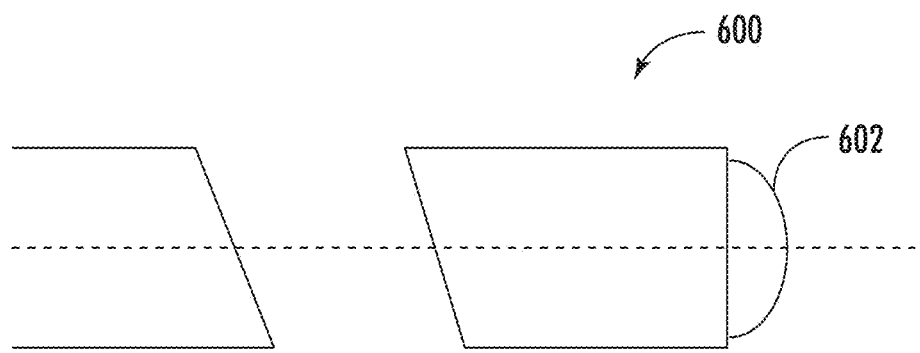
FIG. 6B is a close-up side view of the compact collimator of FIG. 6A.

FIG. 6B is a close-up side view of the compact collimator of FIG. 6A. A pointing angle between an optical beam from a collimator 600 and the side and bottom surface of the groove can be eliminated (or at least reduced) by controlling the relative position between the lens 602 and the fiber optic pigtail 604 (see FIG. 8A) of the collimator 600. By fine tuning the position of the fiber optic pigtail 604 to make an outgoing beam come across a focal point of the lens 602, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination, and more reliable bonding is possible due to the uniform epoxy or bonding agent. It is noted that FIG. 6B is a schematic illustration used to illustrate concepts of the description, and that the ends of the glass lens and the fiber optic pigtail 604 may be oriented at other angles, including perpendicular, to the body of the glass lens and the fiber optic pigtail, respectively.

The structures of the collimator 600 allow for easier modularization and remove redundant degrees of freedom versus designs in which a collimator is operably coupled and attached to the substrate via external wedges or supports. Thus, the collimator 600 may reduce the complexity and further increase the device efficiency and process reliability of the overall multiplexer/demultiplexer design.

Figure 7A:
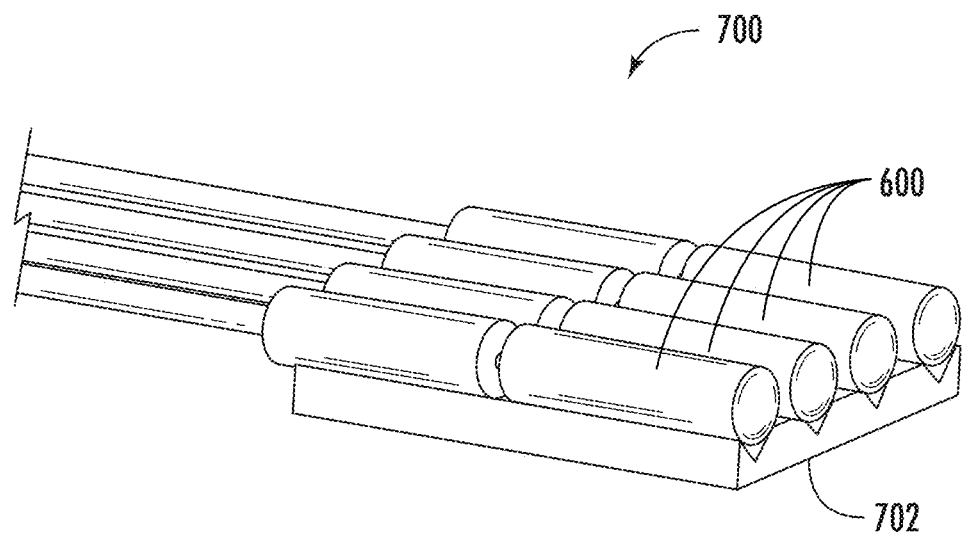
FIG. 7A is a perspective view of an example array of the compact collimators of FIGS. 6A-6B.
Figure 7B:
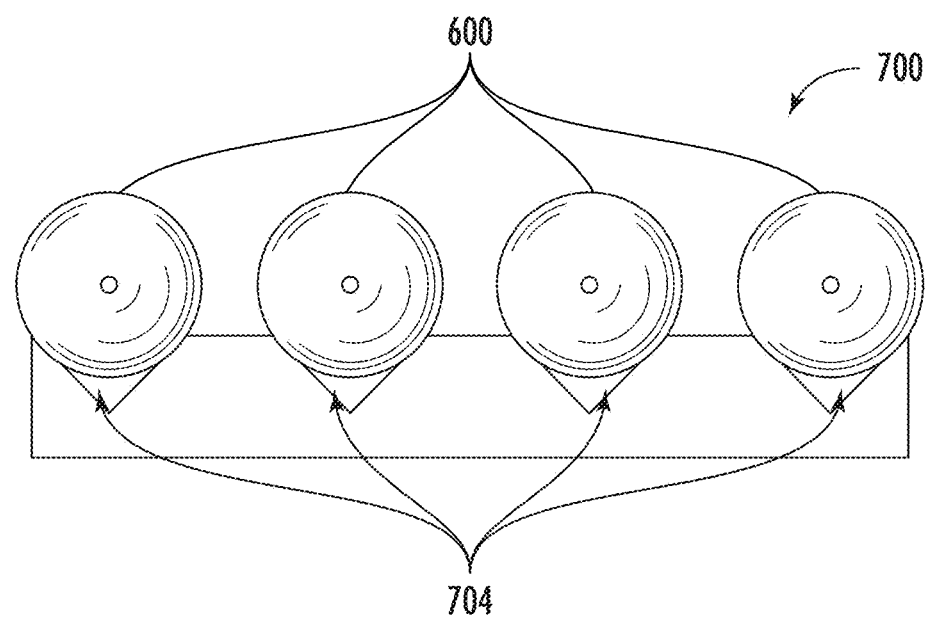
FIG. 7B is a close-up front view of the array of compact collimators of FIG. 7A.

FIGS. 7A-7B are views of an example array 700 of the collimators 600 of FIGS. 6A-6B. The collimators 600 are arranged side-by-side on a surface of a substrate 702, the substrate 702 including a plurality of grooves 704 (discussed above). The grooves 704 could be v-grooves or any other type of groove. A spacing between the substrate 702 of the side-by-side collimators 600 is greater than a spacing between the lenses 602 (see FIGS. 6A-6B) and fiber optic pigtails 604 (see FIGS. 6A-6B) of the side-by-side collimators 600.

Figure 8:
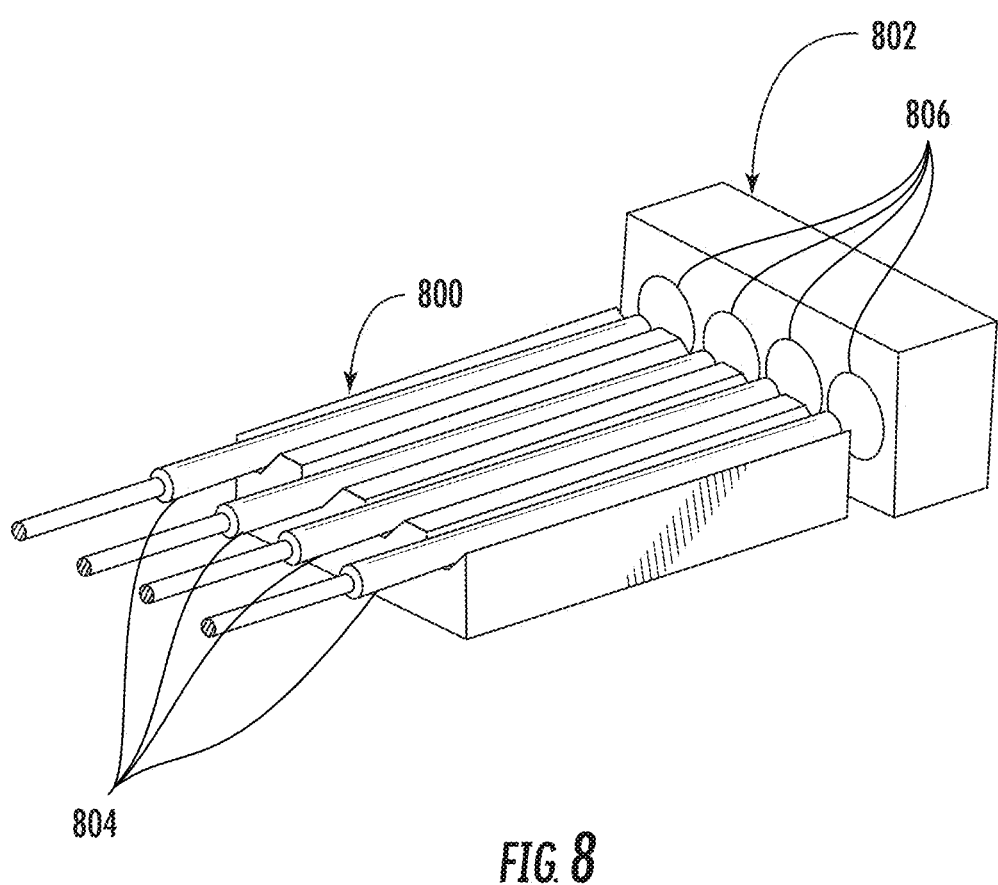
FIG. 8 is a perspective view of an example of a fiber array unit (FAU) for use with the components and devices of FIGS. 3A-3F.

FIG. 8 is a perspective view of an example of a fiber array unit (FAU) 800 and multi-lens array (MLA) 802 for use with the components and devices of FIGS. 3A-3F. More specifically, the FAU 800 includes a plurality of fibers 804, and the MLA 802 includes a plurality of lenses 806. The FAU 800 and MLA 802 can be used with any of the embodiments discussed above.

It will be apparent to those skilled in the art that various modifications and variations can be made without departing from the spirit or scope of the invention.

Further, as used herein, it is intended that term optical fiber or similar terms include all types of single mode and multi-mode light waveguides, including one or more optical fibers that may be glass core, plastic core, coated, uncoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wavelength-division multiplexing (WDM) device, comprising:
   a common layer comprising:
      a first common port configured for optical communication of a multiplexed signal comprising a plurality of signals; and
      a plurality of WDM filters each having different passband so as to be configured to pass a different signal of the plurality of signals and reflect other signals of the plurality of signals, wherein the plurality of WDM filters includes a first WDM filter array and a second WDM filter array that is spaced from the first WDM filter array;
   a first channel layer comprising a first channel array of channel ports, wherein each channel port in the first channel array is configured for optical communication of one of the different signals passed by the WDM filters in the first WDM filter array;
   a second channel layer comprising a second channel array of channel ports, wherein each channel port in the second channel array is configured for optical communication of one of the different signals passed by the WDM filters in the second WDM filter array;
   a first optical signal router configured to route the different signals passed by the WDM filters in the first WDM filter array from the common layer to the first channel layer; and
   a second optical signal router configured to route the different signals passed by the WDM filters in the second WDM filter array from the common layer to the second channel layer.

2. The WDM device of claim 1, wherein the first optical signal router comprises a first trapezoidal prism and the second optical signal router comprises a second trapezoidal prism.

3. The WDM device of claim 1, wherein the first optical signal router is positioned to overlap the common layer and the first channel layer.

4. The WDM device of claim 3, wherein the second optical signal router is positioned to overlap the common layer and the second channel layer.

5. The WDM device of claim 1, wherein the common layer comprises a common layer substrate and the first common port and the plurality of WDM filters are coupled to the common layer substrate, wherein the first channel layer comprises a first channel layer substrate and the channel ports of the first channel array are coupled to the first channel layer substrate, and wherein the second channel layer comprises a second channel layer substrate and the channel ports of the second channel array are coupled to the second channel layer substrate.

6. The WDM device of claim 5, wherein first optical signal router is secured to the first channel layer substrate and the second optical signal router is secured to the common layer substrate.

7. The WDM device of claim 6, wherein the common layer substrate, the first channel layer substrate, the second channel layer substrate, the first optical signal router and the second optical signal router have a length between about 35 mm and about 70 mm, a height less than or about equal to 10 mm, and a width less than about 25 mm.

8. The WDM device of claim 5, wherein the common layer substrate is positioned between the first channel layer substrate and the second channel layer substrate.

9. The WDM device of claim 5, wherein the first channel layer substrate is offset from the common layer substrate by a distance equal to or greater than a height of the first common port.

10. The WDM device of claim 5, wherein the second channel layer substrate is offset from the common layer substrate by a distance equal to or greater than a height of the second channel port.

11. The WDM device of claim 1, wherein the first common port comprises a first common collimator and each channel port of the first channel array comprises a first channel collimator.

12. A wavelength-division multiplexing (WDM) device, comprising:
   a common layer comprising:
      a first common port configured for optical communication of a multiplexed signal comprising a plurality of signals; and
      a plurality of WDM filters each having different passband so as to be configured to pass a different signal of the plurality of signals and reflect other signals of the plurality of signals, wherein the plurality of WDM filters includes a first WDM filter array and a second WDM filter array that is spaced from the first WDM filter array;
   a first channel layer comprising a first channel array of channel ports, wherein each channel port in the first channel array is configured for optical communication of one of the different signals passed by the WDM filters in the first WDM filter array;
   a second channel layer comprising a second channel array of channel ports, wherein each channel port in the second channel array is configured for optical communication of one of the different signals passed by the WDM filters in the second WDM filter array, wherein the common layer is located between the first channel layer and the second channel layer;
   a first optical signal router positioned to overlap the common layer and the first channel layer, the first optical signal router configured to route the different signals passed by the WDM filters in the first WDM filter array from the common layer to the first channel layer; and
   a second optical signal router positioned to overlap the common layer and the second channel layer, the second optical signal router configured to route the different signals passed by the WDM filters in the second WDM filter array from the common layer to the second channel layer.

13. The WDM device of claim 12, wherein:
   the common layer further comprises a common layer substrate;
   the first channel layer further comprises a first channel layer substrate; and an offset between the common layer substrate and the first channel layer substrate is equal to or greater than a height of the first common port.

14. The WDM device of claim 12, wherein:
the common layer further comprises a common layer substrate;
the first channel layer further comprises a first channel layer substrate,
the first common port is mounted to a first surface of the common layer substrate; and
the second channel port is mounted to a second surface of the common layer substrate, the second surface opposite the first surface.

15. The WDM device of claim 12, wherein the common layer comprises a common layer substrate and the first common port and the plurality of WDM filters are coupled to the common layer substrate, wherein the first channel layer comprises a first channel layer substrate and the channel ports of the first channel array are coupled to the first channel layer substrate, and wherein the second channel layer comprises a second channel layer substrate and the channel ports of the second channel array are coupled to the second channel layer substrate.

16. The WDM device of claim 15, wherein the first optical signal router is mounted to the first channel layer substrate and the second optical signal router is mounted to the common layer substrate.

17. The WDM device of claim 16, wherein the first optical signal router comprises a first trapezoidal prism and the second optical signal router comprises a second trapezoidal prism.

18. The WDM device of claim 12, wherein the first common port comprises a first common collimator and each channel port of the first channel array comprises a first channel collimator.

19. The WDM device of claim 12, wherein the common layer further comprises a second common port configured for optical communication of a second multiplexed signal.

20. A method of using a wavelength-division multiplexing (WDM) device, comprising:
transmitting from a first common port of a common layer a multiplexed signal comprising a plurality of signals, wherein the common layer includes a plurality of WDM filters each having different passband so as to be configured to pass a different signal of the plurality of signals and reflect other signals of the plurality of signals, and wherein the plurality of WDM filters are arranged in a first WDM filter array and a second WDM filter array that is spaced from the first WDM filter array;
routing the different signals passed by the WDM filters in the first WDM filter array to a first channel array of channel ports of a first channel layer via a first optical signal router, the first channel layer offset from the common layer; and
routing the different signals passed by the WDM filters in the second WDM filter array to a second channel array of channel ports of a second channel layer via a second optical signal router, the second channel layer offset from the common layer.

* * * * *